United States Patent
Charzinski et al.

(10) Patent No.: US 8,027,261 B2
(45) Date of Patent: Sep. 27, 2011

(54) METHOD FOR TRACKING NETWORK PARAMETERS

(75) Inventors: Joachim Charzinski, München (DE); Uwe Walter, Weingarten (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 277 days.

(21) Appl. No.: 12/439,608

(22) PCT Filed: Aug. 28, 2007

(86) PCT No.: PCT/EP2007/058927
§ 371 (c)(1),
(2), (4) Date: Mar. 24, 2009

(87) PCT Pub. No.: WO2008/025769
PCT Pub. Date: Mar. 6, 2008

(65) Prior Publication Data
US 2010/0002586 A1    Jan. 7, 2010

(30) Foreign Application Priority Data

Sep. 1, 2006   (DE) .......................... 10 2006 041 058

(51) Int. Cl.
*H04L 12/56*    (2006.01)
*H04L 1/00*    (2006.01)
(52) U.S. Cl. ........................................ 370/238; 370/252
(58) Field of Classification Search .................. 370/229, 370/230, 230.1, 231, 235, 236, 237, 238, 370/241, 242, 252; 709/223, 225, 226, 230, 709/231, 232, 235, 238
See application file for complete search history.

(56) References Cited

U.S. PATENT DOCUMENTS

| | | | |
|---|---|---|---|
| 4,979,118 A | 12/1990 | Kheradpir | |
| 5,347,511 A | 9/1994 | Gun | |
| 6,385,172 B1 | 5/2002 | Kataria et al. | |

(Continued)

FOREIGN PATENT DOCUMENTS

| | | |
|---|---|---|
| DE | 10301966 A1 | 8/2004 |
| DE | 102004045980 B3 | 5/2006 |
| EP | 0629065 A2 | 12/1994 |
| GB | 2253970 A | 9/1992 |

*Primary Examiner* — Aung S Moe
*Assistant Examiner* — Feben Haile
(74) *Attorney, Agent, or Firm* — Laurence A. Greenberg; Werner H. Stemer; Ralph E. Locher

(57) ABSTRACT

Network parameters are tracked in a communication network, particularly in a packet-based IP network. A traffic matrix for the network is regularly ascertained and a blocking probability for traffic subject to an access control is determined from a current traffic matrix. A check determines whether the blocking probability satisfies a criterion for scheduled network operation. If the criterion is not satisfied and/or redetermination for limits used as part of the access controls using the current traffic matrix does not result in a blocking probability satisfying the criterion then the current traffic matrix is used to determine a new link/cost metric for optimizing traffic transport through the network. New values for limits used as part of the access controls are determined based on the new link/cost metric. If the criterion is then satisfied with the limits fixed at the new values, the link weights are configured with the new link/cost metric in the network and the limits are stipulated at the new values.

23 Claims, 4 Drawing Sheets

U.S. PATENT DOCUMENTS

| | | |
|---|---|---|
| 6,768,718 B1 * | 7/2004 | Beshai et al. ................. 370/237 |
| 2005/0008014 A1 | 1/2005 | Mitra et al. |
| 2005/0068961 A1 * | 3/2005 | Raghunath et al. ........ 370/395.2 |
| 2006/0056299 A1 | 3/2006 | Menth et al. |
| 2008/0101255 A1 | 5/2008 | Charzinski et al. |
| 2009/0022056 A1 * | 1/2009 | Ninan et al. .................. 370/238 |

* cited by examiner

METHOD FOR TRACKING NETWORK PARAMETERS

BACKGROUND OF THE INVENTION

Field of the Invention

The invention relates to a method for tracking network parameters in a communication network formed with nodes and links located between them, with access controls for the purpose of limiting the traffic load.

One of the currently most important developments in the field of networks is the enhancement of conventional data networks or packet networks for the transmissions of so-called real-time traffic, i.e. speech, audio information and video signals. Guaranteeing real-time traffic presupposes that so-called quality-of-service features are maintained. To preserve the quality of service, transmitted traffic must not exceed threshold values for the delay or the latency, the discarding of packets and the jitter, i.e. the fluctuations in the transmission time of individual packets. One important measure for maintaining the quality-of-service parameters is limiting the traffic for packet networks via which real-time traffic is to be transmitted. As a rule, this limiting of traffic is carried out by means of so-called access controls, i.e. traffic to be newly transmitted must be registered and is only admitted if the admission of this traffic would not cause a limit (also called budget) for the maximum traffic to be admitted to be exceeded.

When limits are established for an access control limiting the traffic, the following must be taken into consideration: establishing the limits should guarantee, on the one hand, the desired quality of transmission and, on the other hand, the traffic transmitted via the network should be optimized, i.e. the probability of a non-admission of traffic should be minimized as much as possible. For this reason, the establishment of limits is usually based on the so-called traffic matrix, i.e. the volume of traffic which is to be transmitted between (edge) nodes of the network. The measure used for suitably establishing limits is frequently the so-called blocking probability, i.e. a measure of the probability that a traffic stream to be transmitted between two nodes is not admitted or the frequency with which such a traffic stream is rejected. One possibility to establish limits fairly is to establish these in such a manner that the blocking probabilities are equal for any directions of traffic streams transmitted via the network. In a more economic establishment, traffic directions are preferred which are loaded with a high volume of traffic in order to increase by this means the entire traffic transmitted via the network.

Changing the volume of traffic to be transmitted via the network, and thus the traffic matrix, results in changed blocking probabilities. This change in blocking probabilities can lead to less traffic being transmitted via the network than could be conveyed. For this reason, the adjustment of the limits for the access controls is adapted to changed traffic situations manually by the operator as required.

Printed document DE 10 2004 045980 B3 discloses a method for tracking network parameters, in which method the traffic matrix of the network is regularly determined and a check is performed as to whether the blocking probability for traffic which is subject to an access control satisfies a criterion for a scheduled network operation according to the current traffic matrix. In this context, a scheduled network operation is given, in particular, when the blocking probability determined is below a threshold value. In the method, if the criterion for the scheduled network operation is not satisfied, it is initially attempted to determine by means of the current traffic matrix new values for limits used as part of the access control. If the blocking probability, after re-establishment of the limits, should satisfy the criterion for the scheduled network operation, the limits are set to the new values. The printed document also shows that in the case where a redetermination of the limits does not lead to the criterion for the scheduled network operation being satisfied, in a second step, new values are calculated for the link weights of the link/cost metric used for routing by means of the current traffic matrix with the aid of an optimization. Following this, the new link/cost metric is used to check again whether the new link weights lead to values for the limits according to which the criterion for the scheduled network operation is satisfied. If the criterion is satisfied, the network is configured with the new link weights. One disadvantage of the document discussed above consists in that a re-establishment of the limits by optimizing the link weights is very costly in terms of computing time and there may thus be a delay in the data transmission in the network.

BRIEF SUMMARY OF THE INVENTION

It is the object of the invention, therefore, to create a method for tracking network parameters in a communication network in which, when the traffic matrix or the topology of the network is changed, the limits for the access controls can be adapted in a simple and rapid manner.

This object is achieved by the independent patent claims. Developments of the invention are defined in the dependent claims.

The method according to the invention is used for communication networks which are characterized by a multiplicity of nodes and links located between them, wherein the communication network is preferably a packet-based IP (Internet Protocol) network. In this arrangement, the communication network is subject to access controls via which the traffic load is limited. The access controls are achieved by establishing budgets or limits which specify up to what traffic load a traffic registered in the network is transmitted by the network. If these limits are exceeded, scheduled network operation can no longer be guaranteed and the registered traffic is rejected and not transmitted in the network. In the method according to the invention, the forwarding (also called routing) of traffic is effected via a so-called link/cost metric with link weights for the links.

In the method according to the invention, the traffic matrix of the network is determined at regular intervals (step a)). Then the blocking probability (already mentioned above) for traffic which is subject to an access control is determined from the current traffic matrix (step b)). Finally, in a step c), a check is made to determine whether the blocking probability determined satisfies a criterion for a scheduled network operation. In the case where the blocking probability does not satisfy this criterion or in the case where a redetermination for limits used as part of the access controls using the current traffic matrix does not lead to a blocking probability which satisfies the criterion, then the current traffic matrix is used in a step d) to determine a new link/cost metric for optimizing the transport of traffic through the network. In a step e), new values for limits used as part of the access controls are determined on the basis of the new link/cost metric and, following the determination of the new values for the limits, a check is made to determine whether the criterion is satisfied when the limits are re-established at these values. If this is so, the link weights are configured in step f) with the new link/cost metric in the network and the limits are established at the new values.

The method according to the invention is characterized by a particular arrangement of step d) according to which a new link/cost metric is determined for optimizing the transport of traffic. In contrast to the prior art, in step d), the link/cost metric is first optimized for the transport of traffic through the network without taking into consideration error cases, which requires much less computational effort than an optimization which takes into consideration error cases. An optimization without taking into consideration error cases is understood to be an optimization which does not include any link or node failures in the network. Such an optimization often already leads to it being possible to establish in the subsequent step e) that the criterion is satisfied when the limits are re-established on the basis of the new link/cost metric. It is only in the case where it is established in step e) that the criterion is not satisfied on the basis of the new link/cost metric optimized without taking into consideration error cases that the process returns to step d) again and the link/cost metric for transporting traffic through the network is optimized taking into consideration error cases. An optimization taking into consideration error cases is understood to be an optimization which also takes into consideration node or link failures. However, the second step of optimization is only used in this case if the first, less computing-time-intensive optimization was not successful. In many cases, the method according to the invention, due to the proposed two-stage optimization, thus leads to limits or budgets, suitable in accordance with the current traffic matrix, via which the access controls are controlled in the network, in much shorter time.

In a preferred embodiment of the method according to the invention, the optimization of the link/cost metric, which may have been carried out taking into consideration error cases, comprises a first optimization, according to which:

in several optimization runs, different link/cost metrics, particularly for multi-path routing, without taking into consideration error cases are determined, for predetermined error cases, the load distributions of these link/cost metrics are entered into a list of error patterns, and of the link/cost metrics, the one which generates the lowest maximum link loading in the error cases is selected.

This optimization requires very little computing time since it first determines link/cost metrics without taking into consideration error cases. Following this, error scenarios from a list of error patterns are considered on the basis of the link/cost metrics determined and the link/cost metric is selected which has the lowest maximum, preferably relative link loading of all links. The error cases are thus taken into consideration not during the actual optimization but subsequently via the criterion of lowest maximum link loading.

In a further preferred embodiment, the optimization of the link/cost metric taking into consideration error cases can comprise alternatively or additionally to the abovementioned first optimization a second optimization, according to which a list of predetermined error patterns is predetermined and the link/cost metrics, particularly for multi-path routing, are optimized with respect to the maximum, preferably relative link loading for the list of predetermined error patterns, the aim of the optimization being the lowest maximum link load, in particular. Although this method is computing-time-intensive, it supplies the optimum link/cost metric for each possible error scenario.

In a further embodiment of the method according to the invention, both the first optimization and the second optimization is used, wherein first the first optimization is performed and in the case where it is established in the subsequent step e) that the criterion is not satisfied when the limits are re-established on the basis of the link/cost metric optimized in accordance with the first optimization, the process returns to step d) and the second optimization is performed. In this manner, a multi-stage method is created in which the optimization is improved step by step in order to achieve that the blocking probability satisfies the criterion for scheduled network operation.

In a further, preferred embodiment of the invention, the network operator is warned if the criterion is not satisfied.

The network operator has a possibility of initiating corresponding countermeasures in order to adapt his network in such a manner that the registered traffic load can be carried in the network.

According to a particularly preferred embodiment, the criterion for the scheduled network operation is given by a threshold value for the blocking probability being maintained.

In a further embodiment of the invention, the topology of the network is taken into consideration in the determination of new values for the limits, wherein, in particular, a change in the topology of the network triggers the performance of the method according to the invention. This ensures that the network parameters are always adapted to the current network topology.

In a further embodiment, the method according to the invention is performed with the aid of a central network control server, the central network control server preferably providing one or more network parameters for the network operator during the performance of the method. In a further embodiment, these network parameters provided comprise the blocking probability and/or the packet delay between nodes and/or packet losses between nodes. The central network control server preferably takes into consideration current and past network parameters and stores them in a corresponding database.

In a further embodiment of the method according to the invention, the network parameters provided by the central network control server are called up by the network operator and/or are conveyed in an automated manner to the network operator.

In one embodiment, the central network control server can determine tariff tables for the network operator from network parameters. During the determination of such tariff tables, the central network control server preferably determines the traffic load to be expected at respective times of the day from the collected measurement data and estimates from these how much additional traffic load can still be carried by the network at the respective time of the day without failure of nodes and/or links. In one preferred embodiment, in the determination of the tariff tables, a function provided by the network operator is taken into consideration which specifies in dependence on the time of the day how a change in tariff changes the traffic load, wherein the central network control server calculates with the aid of the function which tariff change leads to a uniform traffic load in the network at a respective time of the day.

Apart from the method described above, the invention also relates to a communication network which is arranged in such a manner that the method according to the invention can be performed in the communication network. Such a communication network preferably comprises a central network control server, a multiplicity of routers, one router being provided in each node, and a multiplicity of network access control computers, one network access control computer being allocated to each router.

Apart from the communication network, the invention also relates to a network computer for use as central network control server in the above communication network, the network computer being arranged for the distributed performance of the method according to the invention and having means for performing a part of the steps of the method and means for communication with at least one further device for the purpose of distributed performance of the method.

In the text which follows, the subject matter of the invention will be explained in greater detail in the context of exemplary embodiments, referring to figures, in which:

DESCRIPTION OF THE INVENTION

Figure 1:
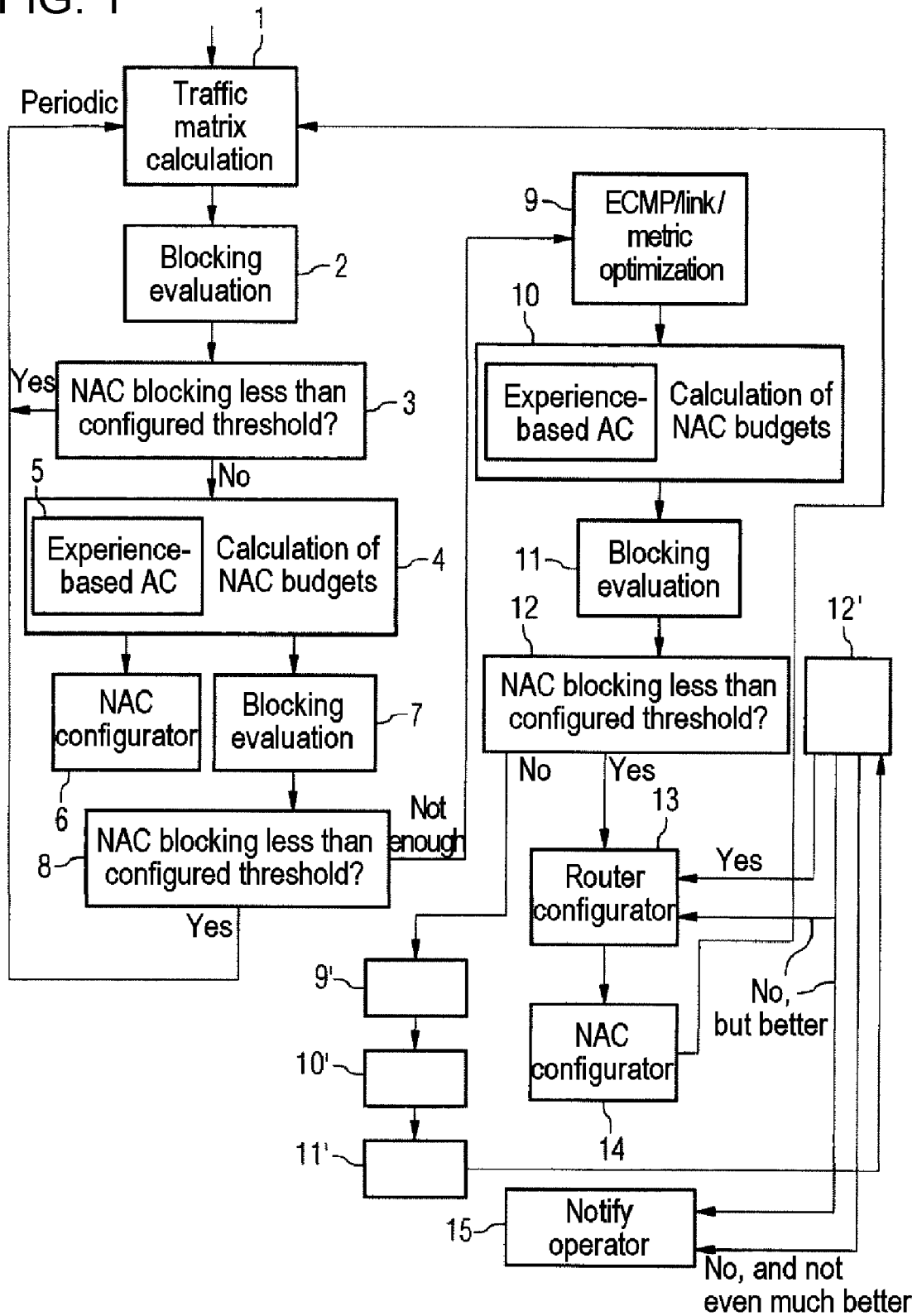
FIG. 1 shows the flowchart of an embodiment of the method according to the invention.

FIG. 1 shows the individual steps, carried out periodically, of an embodiment of the method according to the invention:

1: Calculation of the traffic matrix.

2: Calculation of the blocking probabilities.

3: Checking if the blocking probabilities exceed threshold values. If not, the traffic matrix is recalculated again after a period of time. If a threshold value is exceeded, item 4 is carried out next.

4: The limits of the access controls are recalculated. The calculated limits can be additionally adapted on the basis of empirical values. According to experience, calculated or nominal limits can be exceeded because, as a rule, the volume of traffic actually transmitted is less than that registered for the transmission. From this, an empirical value can be derived for overbooking (step 5) and the limits can be correspondingly adapted (step 6).

5: Including an empirical value for overbooking.

6: Adapting the limits as determined by the overbooking.

7: Calculating the blocking probabilities.

8: Checking whether the calculated blocking probabilities are below the thresholds. If the thresholds are not exceeded, the traffic matrix is recalculated again after a period of time. If not, step 9 follows.

9: Re-optimization of the link/cost metrics, the ECMP optimization being specified by way of example. In step 9, an optimization is first performed without taking into consideration error patterns, i.e. the link/cost metric is optimized for the normal case without node or link failures.

10: Recalculating the limits. The limits are determined analogously to the above step 5 on the basis of the new link/cost metric optimized without taking into consideration error cases, wherein an adaptation on the basis of empirical values may again be performed. The new limits or budgets are preferably calculated without taking into consideration error cases.

11: Calculating the blocking probabilities on the basis of the new limits.

12: Checking if the recalculated blocking probabilities are lower than the threshold values. If the threshold criterion is not satisfied, step 9' is carried out next.

9': Re-optimizing the link/cost metrics analogously to the preceding step 9, but taking into consideration error cases. In this context, in particular, a re-optimization on the basis of claim 2 is carried out, which needs little computing time.

10': Recalculating the limits with the new link/cost metric analogously to step 10. In this context, the occurrence of error cases is preferably also taken into consideration in the determination of the limits.

11': Calculating the blocking probabilities on the basis of the new limits calculated in step 10'.

12': Checking if the recalculated blocking probabilities are lower than the threshold values, analogously to step 12. If the threshold criterion is not satisfied and the result after optimization of the link/cost metric is also not much better than before (i.e. the blocking probability has not become much smaller), the network operator is informed in step 15, which is indicated by the arrow designated "no, and not even much better". If the threshold criterion is satisfied in step 12', the router is configured in accordance with the new link/cost metric in step 13. Following this, the limits for the access control are established at the recalculated values in step 14. Should it happen that, although the threshold criterion has not yet been satisfied, the blocking probability is distinctly closer to the threshold, the network operator is informed in step 15, on the one hand, and, on the other hand, a router configuration is also performed in step 13 on the basis of the recalculated link metrics. Furthermore, the limits for the access control are established at the recalculated values in step 14.

Figure 2:
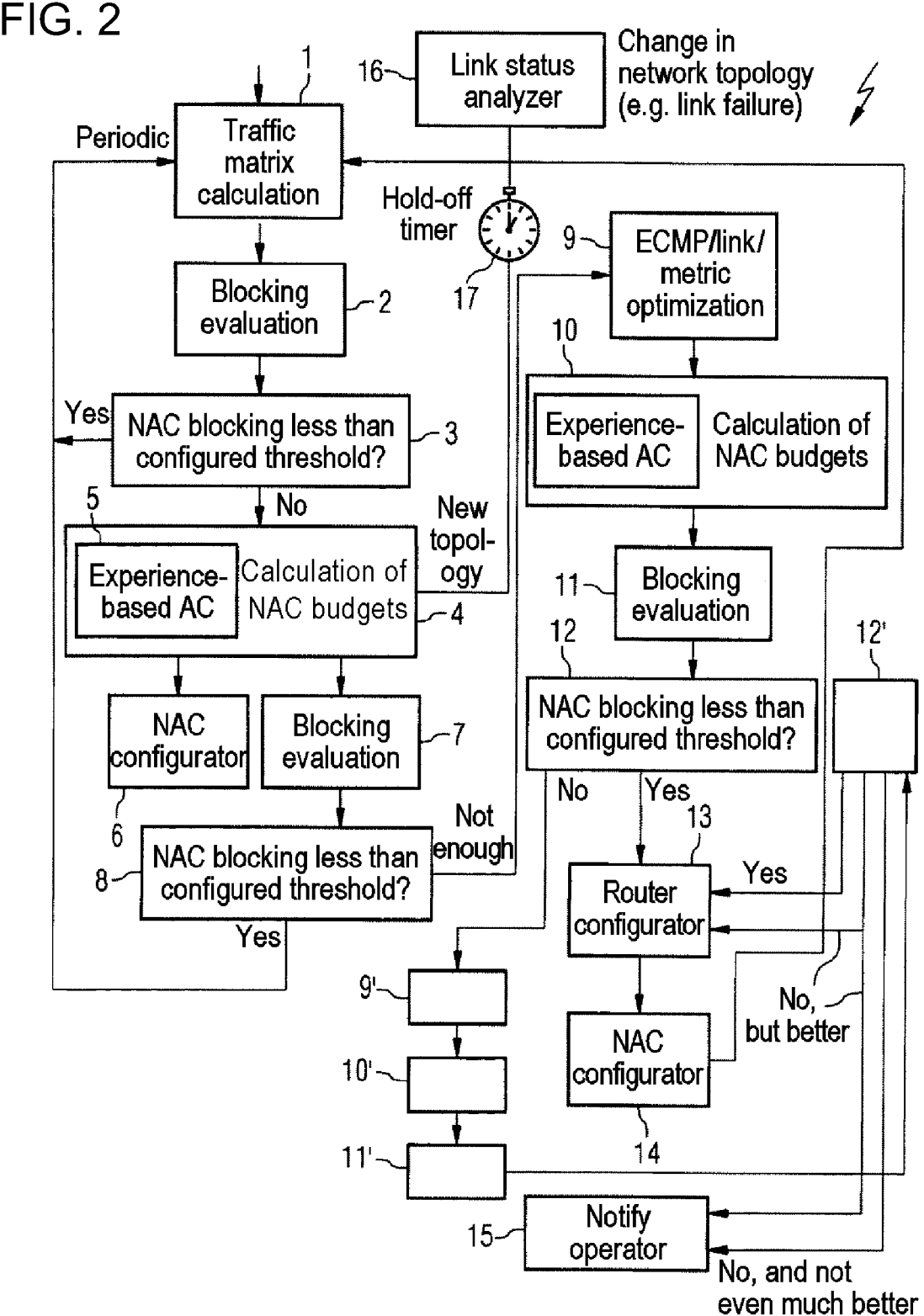
FIG. 2 shows the flowchart of FIG. 1 with additionally provided input when the network topology is changed.

FIG. 2 shows an extension of the procedure according to FIG. 1. In the method of FIG. 2, the limits are recalculated in step 5 not only when the threshold values are exceeded in step 3 but also when the topology changes in the network. The change in topology in the network is here detected in an analysis step 16, where in this step, in particular, the failure of links in the network is determined. In this context, a timer 17 is also used which begins to run when a link fails. The calculation according to step 4 is triggered only if a predetermined period of time has elapsed without the failed link returning in the network. This ensures that the limits are recalculated only in the case of prolonged, permanent link failures.

The methods described with reference to FIGS. 1 and 2 can also be modified in such a manner that, after the optimization has been carried out in step 9' and steps 10', 11' and 12' have then been performed, a further optimization is again performed if the blocking probabilities are not below the threshold values in step 12'. In this context, the further optimization is an optimization which is improved compared with the preceding optimization 9' but needs more computing time. In particular, the optimization according to claim 3 can be used. After this further optimization has been performed, the further steps of the recalculation of the limits, of the calculation of the blocking probabilities and of checking whether the blocking probabilities are below the threshold values follow analogously. After the checking, the same steps explained with reference to the preceding step 12' are initiated depending on the result of the checking.

The method according to the invention can be provided with a multiplicity of options and extensions. In one variant, the network control server NCS can carry out calculations which are associated with the so-called GoS (grade of service) or QoS (quality of service) parameters of the network. In this context, those GoS or QoS parameters which are relevant to the network user are taken into consideration. Such parameters are the blocking probability, the limits or budgets and selected parameters for the algorithms for managing the network access in the network access control computers NAC. The network control server knows, for example, the blocking probability in the network, both from its own calculations and from measurements at the network access control computers. This quantity can then be provided by the network control server to the network operator at a suitable interface so that he can also provide an affirmation regarding the blocking probability for a certain offer of traffic agreed with the end customer.

According to the invention, any data or network parameters calculated in the network control server can be provided to the network operator at a suitable interface. Preferably, those data which are relevant for the SLA (service level agreement) or the SLS (service level specification, part of an SLA) are provided in this arrangement. The network operator can then use these parameters in his SLAs which he concludes with his customers. In particular, the parameters of blocking probability, packet delay and packet loss are relevant in this context. In the case of packet delay, the network control server can determine on the basis of the algorithms, selected for the network access control computers, for calculating effective bandwidths, on the basis of the existing budgets and on the basis of the transit times of packets on the lines of the network, known from the network topology, which distribution of the packet transit times through the network from one input to one output can be expected. Correspondingly, it can provide the corresponding mean values per input/output pair of nodes or over the entire network to the network operator on request (possibly weighted with the respective traffic volume). In the case of packet losses, the network control server can estimate on the basis of the access control algorithms used and of a simple analytic model (e.g. the M/D/1-s queue model) what packet loss rates are to be expected, and it can provide these packet losses to the operator for each pair of input/output nodes or averaged throughout the network.

In the method according to the invention, the following further options are also possible:

The limit values for blockages, delays and losses can be determined either on the basis of the parameters set in the network, or the opposite way can be taken, according to which the network operator predetermines a limit value and the network control server selects the corresponding operating parameters of the network access computers. This is possible for delays and losses. The blocking probability is in each case obtained from the network access algorithms, the budgets and the traffic offered. If the network operator predetermines a blocking value, the network control server can output an alarm when the predetermined value is exceeded.

Network parameters can be called up by the network operator as described above. As an alternative, the parameters can also be included directly via a suitable method (protocol, data interface) in the contractual management of the operator which provides the SLAs for end customers. The parameters guaranteed by the network operator can be provided, for example, on an automatically generated web page.

The instantaneous QoS parameters (particularly the blocking probability, the delay distribution and the losses) can be made retrievable on automatically generated web pages so that the customers can inform themselves that the parameters are maintained (having a certain confidence in the measuring architecture of the operator).

The network control server maintains a history via measurement values from the network which are relevant for the SLA parameters known to it and stores these values in a database. This supports the quality management of the operator and he can check his own measurement values in the case of customer complaints.

Depending on the requirement of the network operator, the parameters can be averaged over time or only the parameters valid for the traffic offered in the main traffic time (e.g. main traffic hour) can be used.

The blocking values can also include experiences of the network control server about the frequency and duration of line failures in the network.

In a further variant of the method according to the invention, the possibility exists that the network control server generates, or at least verifies, the tariffs used by the network operator if a network operator offers load-dependent tariffs to his customers for reserving bandwidth with QoS assurance. This can be implemented by the network control server automatically generating the tariff tables (i.e. the information about how much has to be paid for what bandwidth at what time), using for this purpose the experience collected from measurement data about the time of the day at which what traffic offer is to be expected. From this, the network control server can estimate how much additional traffic offer is still supportable at the respective time of the day. Using an additional function F1 to be provided by the operator, the network control server can then estimate what tariff change is in each case available for what time of the day. In this connection, the function F1 maps the pair (tariff change, time of the day) into a corresponding additional offer of traffic to be expected. It can be expected that the function has a negative derivation with respect to the tariff change, i.e. a lowering of the traffic will lead to an increase in the registered traffic offer. In this context, the network control server determines, by inverting the function F1, the tariff change which is reasonable at the respective time of the day, with the aim of ensuring uniform loading of the network for the times of the day and the highest possible gain for the operator.

In using load-dependent tariffs calculated by the network control server, the following options are possible:

The tariffs calculated in each case by the network control server are provided to the end customers automatically via a suitable interface (e.g. automatically generated web page or as a component of the signaling between service user and network access control computer).

As an alternative, the network control server provides the proposed tariffs only to the network operator who thereupon occasionally checks his published tariffs.

The network operator can firmly predetermine the desired diurnal limits for the tariffs and allow the network controller itself to determine the tariffs. In the latter case, the operator can predetermine a maximum number and a minimum duration of tariff windows.

The network control server can itself empirically determine the above function F1 which is usually provided by the operator, in that it lowers the tariffs slowly and in small steps in times of little traffic and observes the change in the traffic offer.

The network operator can explicitly predetermine a lower barrier for the tariffs in the case of automatic operation.

The function F1 can be selected independently for different network inputs and for different edge-to-edge relations or it can be assumed as homogeneous for the entire network.

Using the method according to the invention, the advantage is achieved, in particular, that the reactions of the network control server in the metric optimization are accelerated by using a metric calculation without error cases, which saves computing time, so that the network control server can find a good solution in critical cases (blocking too high, metrics must be optimized), more rapidly than if it were to carry out the computing-time-intensive optimization including error cases immediately.

Conveying network parameters between the network control server and the network operator according to one variant of the invention reduces the effort for the network operator in establishing parameters for SLAs. In addition, the risk of the network operator having to make compensation payments because of nonobservance of parameters specified in the SLAs is reduced.

In the variant of the invention in which the network control server determines load-dependent tariffs, such tariffs can be implemented more simply by the network operator and the network can be loaded better without great risk by the network operator.

Figure 3:
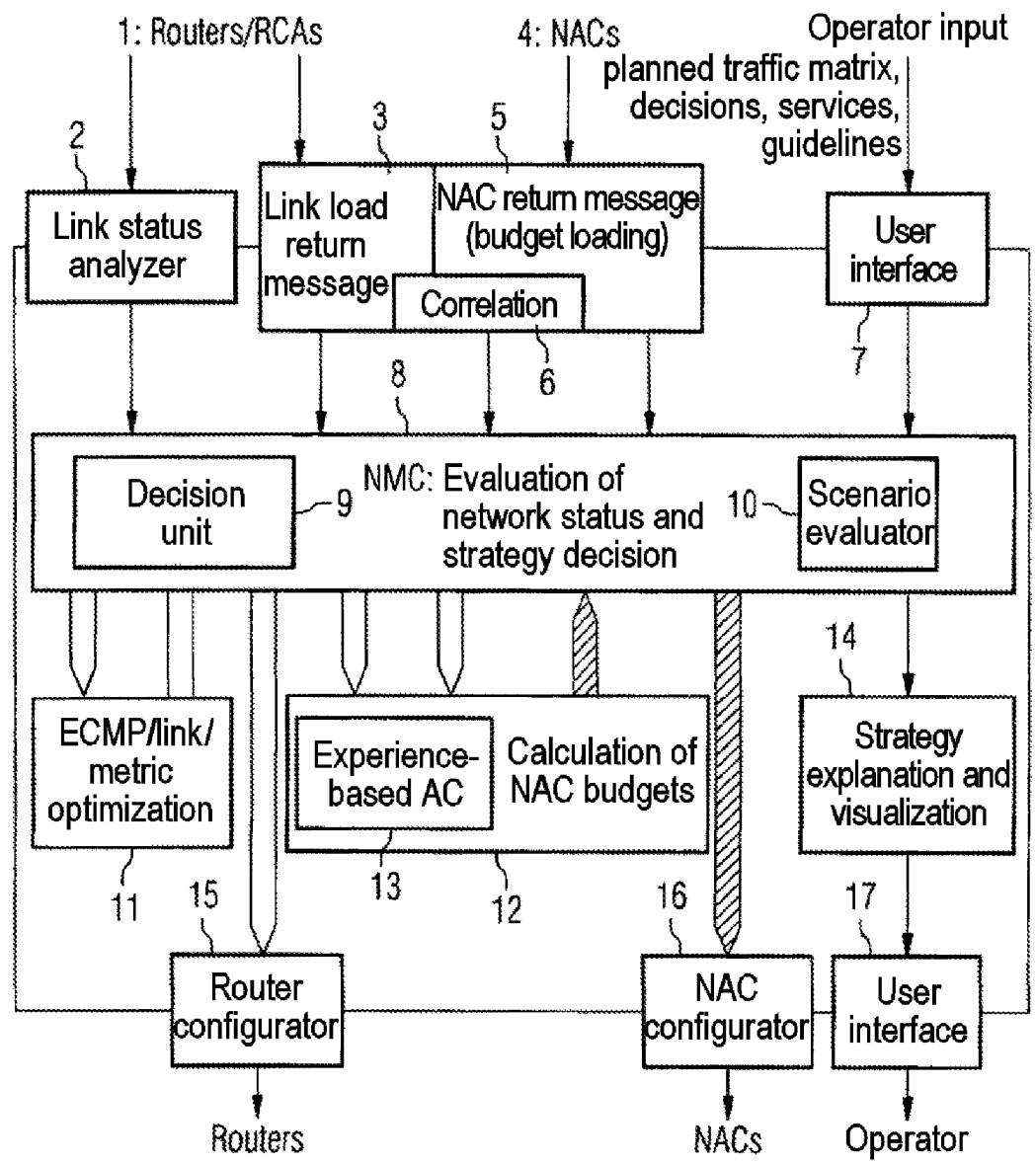
FIG. 3 shows a diagrammatic representation of a network control server with the functions needed for the invention.

FIG. 3 shows the configuration of a network control server with functions for a procedure according to the invention. This network control server receives three different types of input, namely input from routers of the network or so-called router control agents (RCA) 1, which supply information to a module for topology analysis 2 and a module for controlling the link load 3. Further input comes from the network control entities or the network access control computers 4 which convey the current loading of the limits for the access controls and other information to a module 5 for monitoring the budget utilization. Finally, there is the possibility of inputting planned traffic matrices, services, evaluation criteria and similar via a user interface 7. A module 8 for assessing the operating state of the network and for strategy decisions is a central component of the network control server. This module is supplied with the entire input of the network control server—possibly in a preprocessed or edited form, e.g. by means of a processing module 6. The module contains a component for decisions 9 to be made and a component for assessing various scenarios 10. Using the central module 8, the following information or results are then generated: an optimized link metric 11, recalculated limits for the access control 12, possibly adapted by empirical values 13, and an edit of the strategy with explanations 14. The network control server has the following output modules: a configurator for routers 15, a configurator for limits for the access controls 16 and a user interface 17 for information to be forwarded to the network operator or the network management.

This network control server can be used for implementing the methods shown in FIG. 1 and FIG. 2, respectively. As an alternative, these methods can also be implemented in other device elements, possibly in distributed form.

Figure 4:
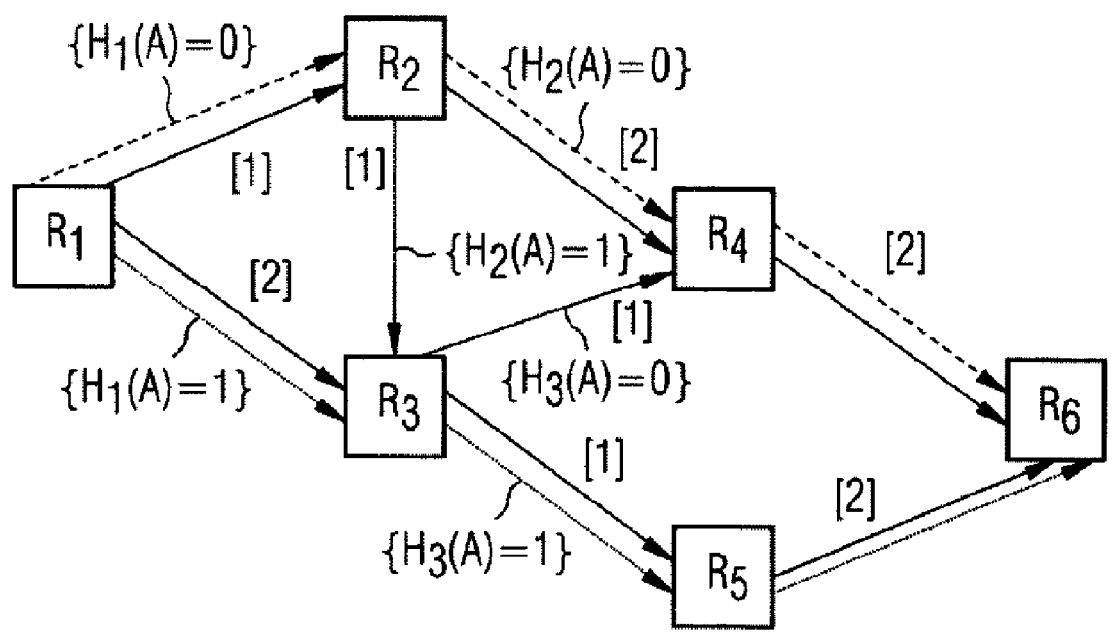
FIG. 4 shows an arrangement of a packet-switched communication network in which the method according to the invention can be performed.

FIG. 4 shows a section of a packet-switched communication network in which the method according to the invention can be used. The communication network consists of six network nodes or routers R1 to R6. Network node R1 is connected to network nodes R2 and R3 via one link path in each case. Network node R2, in turn, is connected via in each case one link path to network nodes R3 and R4, and network node R3, in turn, is connected via in each case one link path to network nodes R4 and R5. Network nodes R4 and R5 are in each case connected to network node R6 via one link path.

FIG. 4 is used for explaining by way of example in the text which follows how data packets are forwarded or routed and distributed, taking into consideration link/cost metrics, by means of hash function methods from (input) network node R1 to (destination) network node R6. The numbers in square brackets represent the cost metrics, to be understood as being bidirectional in this case, for the link paths or links, respectively. This is 1 for the link path between network nodes R1 and R2, it is 2 for the link path between network nodes R1 and R3, 1 for R2-R3, 2 for R2-R4, 1 for R3-R4, 1 for R3-R5, 2 for R4-R6 and 2 for R5-R6. The information in wavy brackets is intended to represent that network node R1 forwards a data packet with the address combination A to network node R2 when the hash function H1 in network node R1 supplies the value H1 of A=0, i.e. H1(A)=0, or to network node R3 when the hash function H1 of A is equal to 1, i.e. H1(A)=1. Correspondingly, network node R2 forwards a data packet with the hash function H2 of A=0 to network node R4 and a packet with the hash function H2 of A=1 to network node R3. Network node R3 forwards packets with the hash function H3 of A=0 to network node R4 and packets with the hash function H3 of A=1 to network node R5. In this example, network nodes R4 and R5 are intended to not divide the data packets or the traffic any further and to forward them to network node R6.

The following options can be used in the optimization of the link/cost metrics, taking into consideration error cases or error patterns:

- Systematic specification of the error patterns to be taken into consideration, e.g. as combination of the components "no failure", "all individual link errors", "all dual link errors", "all node errors".
- Specification of the error patterns to be taken into consideration, as a list of scenarios to be considered.
- Determination of the scenarios to be considered, e.g. from business relations, so that the traffic relations of the most important customers are protected particularly well.
- Special protection of important traffic paths or more frequently failing links by selective generation of multipath alternatives at the appropriate point.
- Inclusion of only those link errors which are not already intercepted on the physical plane (e.g. by SONET/SDH) in the list of scenarios to be taken into consideration.
- If routers having different availability are used: inclusion of only those routers which are less available (e.g. because not all components are duplicated) in the list of node failures to be taken into consideration.
- Automatic determination of the failure components to be taken into consideration, by means of long-term observations of the error frequency in the network operation.
- Automatic determination of the failure components to be taken into consideration, by means of information about existing alternative routes from the physical layer (transport network, e.g. signaling information from ASON/ASTN, automatically switched optical network or automatically switched transport network, resp.).

In the case of an optimization in which different link/cost metrics are first determined without taking into consideration error cases in several optimization runs (as defined in claim 2), the following options are possible:

Of the optimization runs without taking into consideration error cases (first step), only those metrics are included in the subsequent selection which have in each case generated the lowest maximum link load in the pass case. This can be an absolute criterion or can be a relative criterion, e.g. only the best metric and those in which the maximum link load is worse by no more than a given factor (e.g. 1.1 for 10%) can be included in the selection round (second step). This preselection (additional selection step) regulates the trade off between loading in the pass case and loading in the error case.

The invention claimed is:

1. A method for tracking network parameters in a communication network formed with nodes and links between the nodes, with access controls for the purpose of limiting a traffic load, wherein the network parameters comprise a link/cost metric with link weights for the links, the method which comprises the following steps, to be performed by a control server:
   a) regularly determining a traffic matrix for the network;
   b) determining from the current traffic matrix a blocking probability for traffic, which is subject to an access control;
   c) performing a check to determine whether the blocking probability satisfies a criterion for a scheduled network operation;

d) if the blocking probability does not satisfy the criterion and/or a redetermination for limits used as part of the access controls using the current traffic matrix does not lead to a blocking probability satisfying the criterion, using the current traffic matrix to determine a new link/cost metric for optimizing the transport of traffic through the network;

e) determining new values for limits used as part of the access controls on the basis of the new link/cost metric and, following the determination of the new values for the limits, performing a check to determine whether the criterion is satisfied when the limits are re-established at these values;

wherein, in step d), the link/cost metric for the transport of traffic through the network is first optimized without taking into consideration error cases, and if the check in step e) establishes that the criterion is not satisfied when the limits are re-established on the basis of the new link/cost metric optimized without taking into consideration error cases, returning to step d) and optimizing the link/cost metric for transporting traffic through the network taking into consideration error cases; and f) if the criterion is satisfied, configuring the link weights with the new link/cost metric in the network and establishing the limits at the new values.

2. The method according to claim 1, wherein the communication network is a packet-based IP network.

3. The method according to claim 1, wherein the optimization of the link/cost metric taking into consideration error cases comprises a first optimization, in which:

in several optimization runs, different link/cost metrics are determined without taking into consideration error cases;

for predetermined error cases, the load distributions of these link/cost metrics are entered into a list of error patterns; and of the link/cost metrics, that link/cost metric is selected which generates a lowest maximum link loading in the error cases.

4. The method according to claim 3, which comprises determining different link/cost metrics for multi-path routing in the several optimization runs.

5. The method according to claim 1, wherein the optimization of the link/cost metric taking into consideration error cases comprises a second optimization, in which:

a list of predetermined error patterns is provided; and the link/cost metrics are optimized with respect to the maximum link loading for the list of predetermined error patterns.

6. The method according to claim 5, which comprises optimizing the link/cost metrics for multi-path routing.

7. The method according to claim 2, which comprises, in the optimization of the link/cost metric taking into consideration error cases, first performing the first optimization and in the case where it is established in the subsequent step e) that the criterion is not satisfied when the limits are re-established on the basis of the link/cost metric optimized in accordance with the first optimization, returning the process to step d) and performing the second optimization.

8. The method according to claim 1, which comprises providing a warning to network management if the criterion is not satisfied.

9. The method according to claim 1, wherein the criterion is given by a threshold value being maintained.

10. The method according to claim 1, which comprises taking into consideration changes in a topology of the network in the determination of new values for the limits.

11. The method according to claim 10, which comprises starting the method for tracking network parameters if triggered by a change in the topology of the network.

12. The method according to claim 1, which comprises performing the method under control of a central network control server.

13. The method according to claim 12, which comprises providing with the central network control server one or more network parameters for a network operator during the performance of the method.

14. The method according to claim 13, wherein the network parameters are selected from the group consisting of a blocking probability and/or a packet delay between nodes and/or packet losses between nodes.

15. The method according to claim 13, which comprises storing with the central network control server current and past network parameters in a database.

16. The method according to claim 13, wherein the network parameters provided by the central network control server are called up by the network operator and/or are conveyed in an automated manner to the network operator.

17. The method according to claim 12, wherein the central network control server determines tariff tables for the network operator from the network parameters.

18. The method according to claim 17, wherein the step of determining the tariff tables comprises determining with the central network control server the traffic load to be expected at respective times of the day from collected measurement data and estimating from the measurement data how much additional traffic load can still be carried by the network at the respective time of the day without failure of nodes and/or links.

19. The method according to claim 17, wherein the step of determining the tariff tables takes into consideration a function provided by the network operator which specifies in dependence on the time of the day how a change in tariff changes the traffic load, and wherein the central network control server calculates with the aid of the function which tariff change leads to a uniform traffic load in the network at a respective time of the day.

20. A communication network, configured to carry out the method according to claim 1.

21. The communication network according to claim 20, configured as a packet-based IP network.

22. The communication network according to claim 20, which comprises a central network control server, a multiplicity of routers, one router being provided in each node, and a multiplicity of network access control computers, one network access control computer being allocated to each said router.

23. In a communication network with a central network control server, comprising:

a network computer configured as the central network control server in the communication network, said network computer being configured for a distributed performance of the method according to claim 1;

said network computer having means for performing a part of the steps of the method; and said network computer having means for communication with at least one further device for the purpose of distributed performance of the method.

* * * * *